United States Patent
Rodrigues et al.

(10) Patent No.: US 8,165,311 B2
(45) Date of Patent: Apr. 24, 2012

(54) AIRFLOW OPTIMIZATION AND NOISE REDUCTION IN COMPUTER SYSTEMS

(75) Inventors: Terence Rodrigues, Austin, TX (US); Bhyrav Murthy Mutnury, Austin, TX (US); Moises Cases, Austin, TX (US); Bruce J. Wilke, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/418,700

(22) Filed: Apr. 6, 2009

(65) Prior Publication Data

US 2010/0252358 A1 Oct. 7, 2010

(51) Int. Cl.
*G10K 11/16* (2006.01)
(52) U.S. Cl. .................................................. 381/71.5
(58) Field of Classification Search .................. 381/71.5
See application file for complete search history.

(56) References Cited

U.S. PATENT DOCUMENTS

| | | | |
|---|---|---|---|
| 3,396,812 A * | 8/1968 | Wilcox et al. ................. | 181/250 |
| 3,826,870 A * | 7/1974 | Wurm et al. ................. | 381/71.5 |
| 4,213,426 A | 7/1980 | Longhouse | |
| 4,358,245 A | 11/1982 | Gray | |
| 4,669,122 A * | 5/1987 | Swinbanks ................. | 381/71.5 |
| 4,783,817 A * | 11/1988 | Hamada et al. ............. | 381/71.5 |
| 4,876,722 A * | 10/1989 | Dekker et al. .............. | 381/71.5 |
| 4,965,832 A * | 10/1990 | Edwards et al. ............ | 381/71.5 |
| 4,996,484 A | 2/1991 | Spies | |
| 5,097,923 A * | 3/1992 | Ziegler et al. ................ | 181/206 |
| 5,278,780 A * | 1/1994 | Eguchi ........................ | 708/322 |
| 5,319,165 A * | 6/1994 | Geddes ........................ | 181/206 |
| 5,377,275 A * | 12/1994 | Suzuki ........................ | 381/71.5 |
| 5,396,561 A * | 3/1995 | Popovich et al. ........... | 381/71.11 |
| 5,420,932 A * | 5/1995 | Goodman .................... | 381/71.5 |
| 5,517,571 A * | 5/1996 | Saruta et al. ................ | 381/71.11 |
| 5,535,283 A * | 7/1996 | Saruta et al. ................ | 381/71.5 |
| 5,544,201 A * | 8/1996 | Hoshino et al. ............. | 375/350 |
| 5,606,622 A * | 2/1997 | Christenson ................. | 381/71.5 |
| 5,636,286 A * | 6/1997 | Makabe et al. .............. | 381/71.5 |
| 5,693,918 A * | 12/1997 | Bremigan et al. ........... | 181/206 |
| 5,778,081 A * | 7/1998 | Patrick ........................ | 381/71.5 |

(Continued)

FOREIGN PATENT DOCUMENTS

WO W09302445 4/1993

(Continued)

OTHER PUBLICATIONS

Paschal Minogue et al "Adaptively Canceling Server Fan Noise", Analog Dialogue 34-2 (2000), pp. 1-6.

(Continued)

*Primary Examiner* — Elvin G Enad
*Assistant Examiner* — Robert W Horn
(74) *Attorney, Agent, or Firm* — Cynthia G. Seal; Jeffrey L. Streets

(57) ABSTRACT

In one embodiment, a fan is used to generate airflow through a computer chassis to a fan air inlet. An audible frequency component of the airflow is identified and selected. A sound wave is generated having a generated frequency equal to the selected audible frequency component of the airflow. The generated sound wave is introduced into the airflow with the generated frequency out of phase with the audible frequency component of the airflow. The magnitude of the generated frequency may be selected as a function of fan speed and/or air sensed pressure within the airflow. The frequency, phase, and magnitude of the generated sound wave may be selected and enforced by a baseboard management controller.

17 Claims, 2 Drawing Sheets

U.S. PATENT DOCUMENTS

| | | | | |
|---|---|---|---|---|
| 5,832,095 | A * | 11/1998 | Daniels | 381/71.5 |
| 5,880,689 | A | 3/1999 | Kushner | |
| 5,995,632 | A * | 11/1999 | Okada | 381/71.3 |
| 6,005,952 | A * | 12/1999 | Klippel | 381/71.11 |
| 6,276,900 | B1 * | 8/2001 | Lyszkowski et al. | 417/2 |
| 6,626,640 | B2 | 9/2003 | Ivanovic | |
| 6,758,304 | B1 * | 7/2004 | McLean | 181/206 |
| 6,963,647 | B1 * | 11/2005 | Krueger et al. | 381/71.5 |
| 7,006,639 | B2 * | 2/2006 | Hobelsberger | 381/96 |
| 7,139,401 | B2 | 11/2006 | Culman et al. | |
| 7,158,644 | B2 * | 1/2007 | Kakuhari et al. | 381/71.5 |
| 7,293,454 | B2 * | 11/2007 | Kreft et al. | 73/114.71 |
| 7,353,908 | B1 | 4/2008 | French | |
| 7,697,700 | B2 * | 4/2010 | Mao | 381/94.3 |
| 7,706,546 | B2 * | 4/2010 | Delchar et al. | 381/71.1 |
| 7,783,055 | B2 * | 8/2010 | Barath et al. | 381/71.3 |
| 7,894,613 | B1 * | 2/2011 | Ong et al. | 381/71.3 |
| 2002/0135943 | A1 | 9/2002 | Nishizawa et al. | |
| 2003/0130969 | A1 * | 7/2003 | Hawkins et al. | 706/15 |
| 2003/0152239 | A1 * | 8/2003 | Graefenstein | 381/71.5 |
| 2007/0110255 | A1 * | 5/2007 | Barath et al. | 381/71.5 |
| 2007/0223714 | A1 | 9/2007 | Nishikawa | |
| 2008/0025523 | A1 | 1/2008 | Miller | |
| 2008/0144851 | A1 * | 6/2008 | Kim | 381/71.5 |
| 2010/0002890 | A1 * | 1/2010 | Lyon et al. | 381/71.5 |

FOREIGN PATENT DOCUMENTS

WO   WO2008028247   3/2008

OTHER PUBLICATIONS

Wikipedia "Active Noise Control", en.wikipedia.org/Active_noise_control, Feb. 16, 2009, pp. 1-5.

BYU News "BYU Physicists Quiet Fans in Computers, Office Equipment", Feb. 16, 2009, pp. 1-3.

Eisenberg, Anne "What's Next; To Quiet a Whirring Computer, Fight Noise With Noise", The New York Times, Technology, Feb. 16, 2009, 5 pages.

* cited by examiner

AIRFLOW OPTIMIZATION AND NOISE REDUCTION IN COMPUTER SYSTEMS

BACKGROUND OF THE INVENTION

1. Field of the Invention

The present invention relates to the airflow optimization and noise reduction in computer systems.

2. Background of the Related Art

Computer systems typically include a number of electronic components disposed within a chassis. These components generate heat as a byproduct of electrical power consumption, and require a cooling system to prevent the components from becoming damaged. A common cooling system includes one or more fans for driving airflow through the chassis across the electronic components. For example, a personal computer (PC) or server may include one or more onboard fans provided inside the chassis of the PC or server. In larger computer systems, such as in a rack-mounted computer system, a shared blower module having multiple fans may be provided in a chassis for cooling multiple servers mounted in the chassis. For larger computer systems, such as in a datacenter, a more comprehensive cooling system may include a dedicated computer room having specialized HVAC equipment and a particular arrangement of racks that includes alternating hot and cold aisles.

The large, high-speed fans and blower modules used for cooling servers are the primary source of noise in the datacenter. A datacenter includes many densely-packaged rack-mounted servers and corresponding fans. The combined noise of the many fans and blower modules in a datacenter produce an undesirable level of noise. Additionally, the many fans and blower modules in a datacenter contribute significantly to the power consumption of the datacenter. Therefore, judicious management of datacenter cooling systems is desirable, for minimizing both power consumption and noise in a datacenter.

BRIEF SUMMARY OF THE INVENTION

One embodiment of the present invention provides a method, wherein a fan is used to generate airflow through a computer chassis to a fan air inlet. An audible frequency component of the airflow is identified and selected. A sound wave is generated having a generated frequency equal to the selected audible frequency component of the airflow. The generated sound wave is introduced into the airflow with the generated frequency out of phase with the audible frequency component of the airflow.

Another embodiment of the invention provides an airflow control system for a computer system. The airflow control system includes a fan for generating airflow through a chassis of the computer system. A first air duct is in fluid communication with a fan air inlet. A microphone is configured for detecting sound in the first air duct. A speaker is in fluid communication with the first air duct. A microcontroller is in electronic communication with the speaker and the microphone. The microcontroller is configured for selecting an audible frequency component of the detected sound and causing the speaker to generate a sound wave having a generated frequency equal to and out of phase with the selected audible frequency component.

DETAILED DESCRIPTION OF THE INVENTION

The present invention includes a system embodiment and a method embodiment for reducing fan noise and improving airflow efficiency in a computer system. The fan noise is related the cyclical compression and rarefaction resulting from using the fans to generate airflow (forced convection) through the computer chassis. In one embodiment, sound is generated using an electronic speaker and introduced (i.e. "injected") slightly upstream of an air inlet to the fan with a frequency, phase, and amplitude selected to at least partially cancel selected frequencies of the fan noise. The fan noise may be sampled with a microphone and analyzed to identify one or more higher-energy frequency components to be cancelled. The magnitude of the injected sound may be selected according to the sound pressure level of the fan noise, which may be estimated partially as a function of fan speed. The injected sound balances the cyclical pressure variations in the computer system chassis to reduce noise and simultaneously improve airflow efficiency and volumetric flow rate of the fan.

Figure 1:
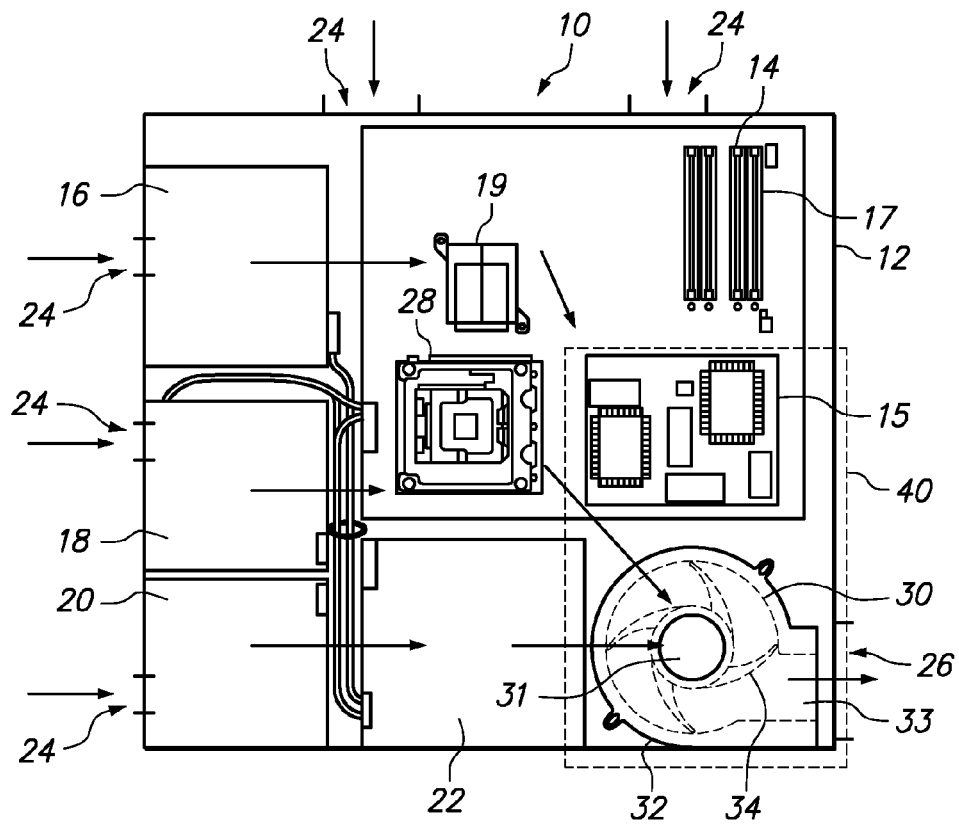
FIG. 1 is a plan view of an exemplary computer system having an airflow-optimized, noise-compensated airflow control system according to an embodiment of the invention.

FIG. 1 is a plan view of an exemplary computer system having an airflow-optimized, noise-compensated airflow control system 40 according to an embodiment of the invention. The computer system includes a server 10 having a "1U" type chassis 12 housing multiple heat-generating system components. The system components include, by way of example, a motherboard 14, an optical disc bay 16, two removable disk drives 18, 20, and a power supply 22. A motherboard typically includes hundreds of electronic components, ranging from basic circuit elements such as capacitors and resistors, to more complex hardware and subsystems such as processor and system memory. The various motherboard components consume electrical power and generate heat. Components of the motherboard 14 that are selectively shown in FIG. 1 include a central processing unit (CPU) 28, a baseboard management controller (BMC) 15, system memory 17 and internal connectors 19 for connecting additional hardware. One skilled in the art will appreciate that the components and component layout of a computer system and its motherboard will vary from system to system; the illustrated components and particular component layout of the server 10 and motherboard 14 in FIG. 1 are provided merely as a reference for discussing the inventive aspects disclosed herein.

The server 10 has a cooling system that includes one or more chassis air inlets 24 and chassis air outlet 26 located along the periphery of the chassis 12, and a cooling fan 30 inside the chassis 12 that generates airflow from the chassis air inlets 24 to the chassis air outlet 26. The cooling fan 30 has a fan housing 32, fan blades 34 disposed within the housing 32, a fan air inlet 31, and a fan air outlet 33 that exits to the chassis air outlet 26. The cooling fan 30 is drawn as a centrifugal type fan in FIG. 1, wherein the fan air inlet 31 is axially oriented and the fan air outlet 33 is tangentially oriented with respect to the fan blade 34. However, another embodiment may instead include an axial-type fan. The chassis air inlets 24 are spaced from the chassis air outlet 26 such that the cooling fan 30 drives the airflow across the heat generating components, and exhausts heated air through the chassis air outlet 26. Arrows in the figure are used to generally indicate the direction airflow through the chassis 12.

The BMC 15 is part of the Intelligent Platform Management Interface (IPMI) architecture. Conventionally, a BMC manages the interface between system management software and platform hardware in a computer system. Different types of sensors built into the computer system report to the BMC on parameters such as temperature, cooling fan speeds, power mode, operating system (OS) status, etc. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again. In this embodiment, the BMC may be provided with additional functionality, allowing it to serve as a controller in optimizing airflow and reducing noise in the server 10, as further discussed below.

Figure 2:
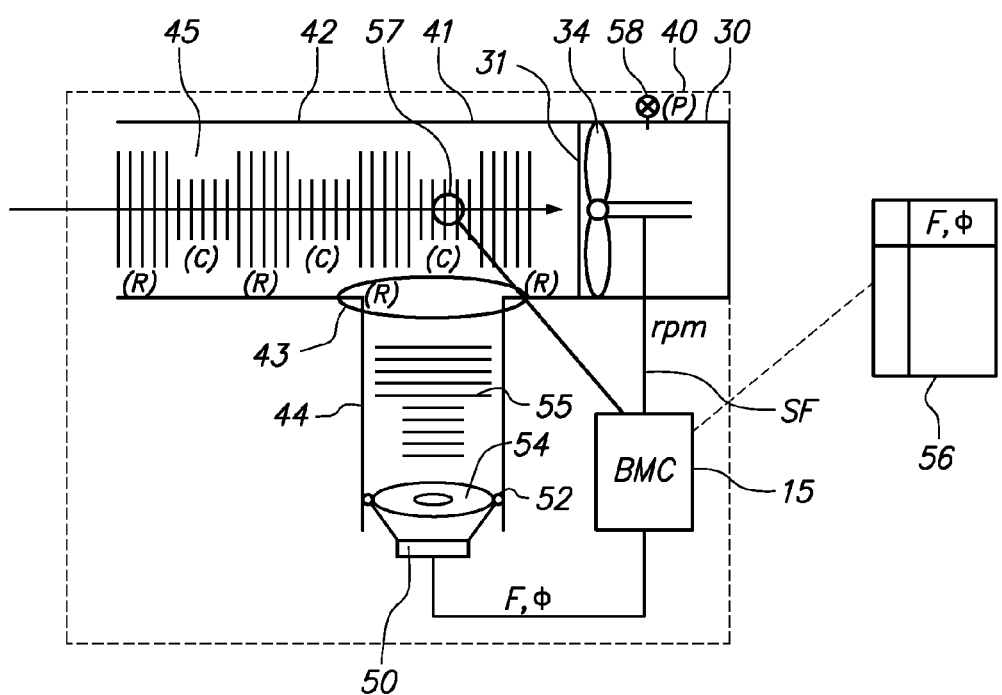
FIG. 2 is a schematic diagram of an example embodiment of the airflow control system.

FIG. 2 is a schematic diagram of an example embodiment of the airflow control system 40. The schematically-represented cooling fan 30 may be any type of fan suitable for generating airflow through a computer system, such as a centrifugal fan (as drawn in FIG. 1) or an axial fan. While the cooling fan 30 in the context of the server of FIG. 1 is an on-board cooling fan, it should be recognized that the principles of controlling noise and airflow taught herein could alternatively be adapted for use inside the housing of a blower module in a multi-server chassis. The airflow control system 40 includes a first air duct 42 having one end 41 in fluid communication with the fan air inlet 31, to guide airflow to the fan air inlet 31. The first air duct 42 defines a moving first air column 45. Although the first air duct 42 is illustrated as having a non-tapered (e.g. constant diameter) inner wall, the first air duct 42 could be imparted with variable wall diameter, such as a tapered section to increase the velocity of airflow entering the fan air inlet 31.

The fan-driven airflow produces audible noise in the computer system, characterized by an alternating compression phase ("C") and rarefaction phases ("R") in the first air column 45. These compression and rarefaction phases are a consequence of numerous system parameters unique to each particular system configuration. The compression and rarefaction phases alternate in a cyclical fashion, at one or more frequencies in the audible frequency range, resulting in audible noise generally described herein as "fan noise." The cyclical compression and rarefaction phases are also responsible for a loss in the airflow efficiency of the cooling fan 30. During the rarefaction phases, for example, the cooling fan 30 is unable to draw in as much air, resulting in lower overall air movement by the cooling fan 30, thus reducing the fan efficiency.

To reduce fan noise and improve airflow, a speaker 50 is used to introduce or "inject" a sound wave into the first air duct 42, to counter the compression and rarefaction phases. A port 43 is provided along the first air duct 42, slightly upstream of the fan air inlet 31. A second air duct 44 is in fluid communication with the first air duct 42 at the port 43. The second air duct 44 is optionally joined to the first air duct 42 at a right angle, forming a T-shaped joint between the first and second air ducts 42, 44. The second air duct 44 defines a second air column 55 that serves as a propagation medium for the sound wave generated by the speaker 50. Due to the relative positioning of the first and second air ducts 42, 44, the second air column 55 is perpendicular to the first air column 45. The speaker 50 is positioned co-axially within the second air duct 44 or at the entrance to the second air duct 44. The speaker 50 is optionally sealed with the second air duct 44 via a sealing member 52, such as an o-ring. The sound wave generated by the speaker 50 propagates through the second air duct 44 and into the first air duct 42 through the port 43. The movement of air in the second air column 55 corresponding to the sound wave results in destructive interference at the location where the second air column 55 meets the first air column 45.

The BMC 15 controls the speaker 50 to generate the sound wave with a magnitude, frequency, and phase selected to partially cancel the cyclical compression and rarefaction otherwise occurring in the first air column 45. The BMC 15 receives a number of system inputs from various sensors used in selecting parameters of the sound to be injected. For example, the BMC 15 is in communication with a microphone 57, which is used to sample the fan noise. The BMC 15 analyzes the sampled fan noise to determine the frequency(s) and corresponding phase(s) of the sound wave to be generated by the speaker 50. The BMC 15 is also in communication with the fan 30, which reports its fan speed, and a pressure sensor 58 used to determine the pressure in the housing of the fan 30. The fan speed and pressure are used to determine the magnitude of the sound to be injected, as further described below.

Figure 3:
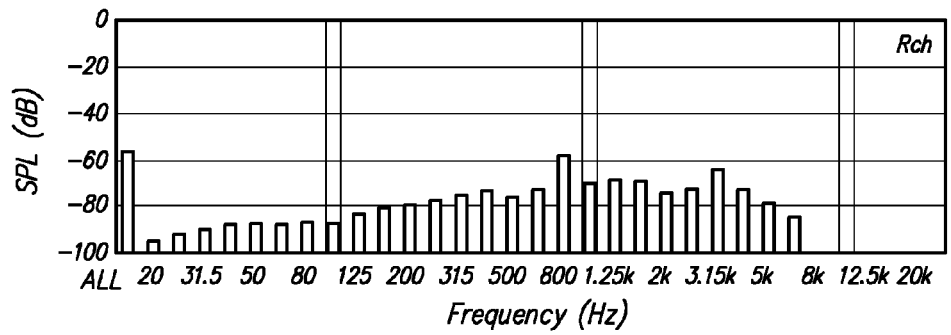
FIG. 3 is a chart illustrating an exemplary noise spectrum for a particular computer system configuration.

The fan noise is typically a superposition of multiple component frequencies, each having different sound pressure levels. FIG. 3 is a chart illustrating an exemplary noise spectrum for a particular server configuration. The noise spectrum may be obtained, for example, using a Fourier analysis to decompose the sampled fan noise into its corresponding component frequencies. The exemplary noise spectrum reveals the range of frequencies, from about 20 Hz to about 7 kHz and the respective sound pressure level of each frequency in decibels (dB). In the noise spectrum of FIG. 3, for example, the highest sound pressure level occurs at about 800 kHz and the second highest sound pressure level occurs at about 3.15 kHz. A substantial reduction in noise levels may be achieved by cancelling only the highest sound pressure levels in the noise spectrum.

Referring again to FIG. 2, the frequency of the compression and rarefaction phases in the first air duct 42 is closely related to the component frequencies of the fan noise having the largest sound pressure levels (i.e., the higher-energy frequency components of the fan noise). Cancellation of these frequencies will significantly reduce the overall noise level of the particular server configuration. The other, lower-energy frequencies cause only minor variations in the compression and rarefaction phases. Thus, the BMC 15 may select only the higher-energy frequency component(s) to be cancelled. The fan noise may be dynamically detected and analyzed to in a real time analysis to determine the frequencies to be canceled. Alternatively, the sound analysis may be performed during a calibration or "training session" for a particular server configuration, to determine the characteristic noise spectrum (see FIG. 3) and higher-energy frequencies to be canceled for the particular server configuration. These parameters are optionally stored in an electronic table 56 for lookup by the BMC 15.

The BMC 15 controls the speaker 50 to generate the selected frequency(s) such that they are out of phase with those frequencies as they occur in the first air duct 42, at the location where the injected sound wave in the second air duct 44 meet the moving first air column 45 in the first air duct 42. For maximal noise reduction, the phase of the injected sound is selected to be substantially 180 degrees out of phase with a frequency of the cyclical compression and rarefaction phases in the first air duct 42. Maximum noise reduction coincides with maximum improvement in airflow efficiency. The speaker-generated sound waves must travel a distance along the second air duct 44 before reaching the first air duct 42, which distance affects the phase of the generated sound wave where it enters the first air duct 42. Thus, the phase of the frequency(s) generated at the speaker 50 may need to be selected in consideration of the dimensional parameters (e.g. length, shape) of the second air duct 44.

The BMC 15 also selects the magnitude of the frequency(s) selected to be generated by the speaker 50. The BMC 15 is in communication with the fan 30 and a pressure sensor 58 within the housing of the fan 30. The fan 30 reports fan speed to the BMC 15. The fan speed may be expressed, for example, in terms of angular frequency or revolutions per minute (RPM) of the fan blade 34. The BMC 15 receives and interprets an electronic signal (labeled "SF") from the cooling fan 30 indicating the fan speed. The pressure sensor 58 senses the air pressure in the housing of the fan 30 and reports the air pressure to the BMC 15. The fan speed and air pressure may both be used in determining the magnitude of the sound to be generated by the speaker 50.

In one embodiment, the BMC 15 selects the SPL of the acoustical noise according to the following equation:

$$LW = KW + 10*\log_{10} Q + 20*\log_{10} P + BFI + CN$$

In this equation, LW is the estimated sound pressure level of the fan noise, expressed in decibels (dB). KW is the specific sound power level depending on the type of fan, which may be included in empirical data provided by the manufacturer of the cooling fan 30. Q is the volume flow rate (cfm) of air flowing through the cooling fan 30, which is a function of the fan speed. P is the air pressure in the housing of the fan 30. BFI is the "Blade Frequency Increment," which is a correction factor for the pure tone produced by the blade passing frequency (bpf), which is also a function of fan speed. The blade passing frequency is the number of fan blades×RPM/60 (Hz). The BFI is added as a correction only to the octave band whose center frequency is closest to the blade passing frequency. CN is an empirically-determined efficiency correction that is provided to account for the phenomenon whereby fans that are operated off their optimum flow conditions get noisier. Using this equation and the fan speed and air-pressure inputs, the BMC 15 determines the magnitude of the noise to be generated by the speaker 50. Thus, the BMC 15 controls the speaker 50 to generate sound having the desired frequency, phase, and magnitude for effective noise cancellation and airflow optimization.

Figure 4:
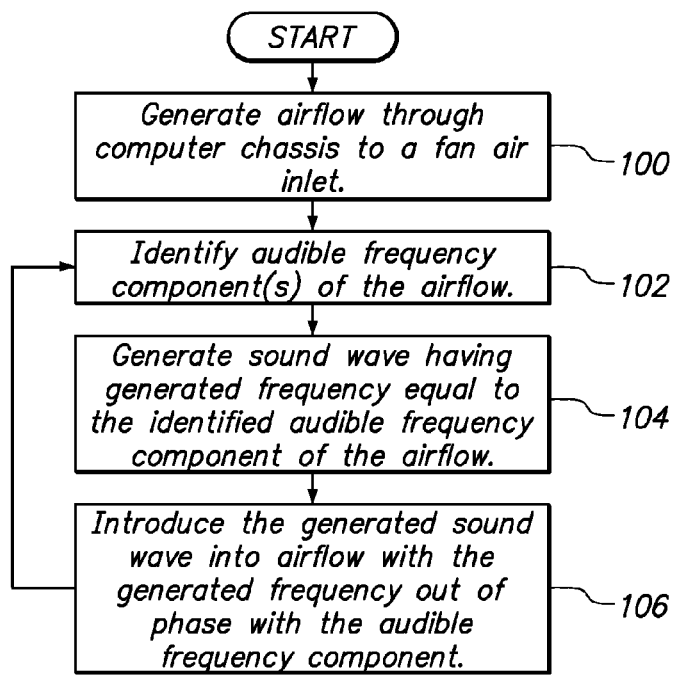
FIG. 4 is a flowchart outlining a method for reducing noise and improving airflow efficiency in a computer system according to an embodiment of the invention.

FIG. 4 is a flowchart outlining a method for reducing noise and improving airflow efficiency in a computer system according to an embodiment of the invention. The steps of the flowchart may be further informed by the various details and aspects of airflow and noise control described with reference to the related discussion of FIGS. 1-3 above. In step 100, airflow is generated through a computer chassis to a fan air inlet. The fan air inlet may be the air inlet to an on-board fan or an external blower module, for example. In step 102, an audible frequency component of the airflow is determined. A microphone may be used to detect audible sound. The detected sound may be analyzed, such as using a Fourier analysis to determine one or more frequency components of the generated sound and the corresponding sound pressure level of the frequency components. The analysis may be performed in real time, or performed in advance during a training session for a particular computer system configuration.

The highest-energy frequency component(s) may be selected, and generated using a speaker in step 104. In step 104, a sound wave is generated having the selected frequency component(s). That sound wave is introduced into the airflow to the fan air inlet in step 106. The phase of the generated frequency(s) of the sound wave are controlled to be out of phase at the location where the sound wave meets the airflow. The magnitude of the generated frequency(s) may be selected as a function of one or both of the fan speed and air pressure sensed within the airflow. Step 102 may be repeated, as shown in the loop, to dynamically identify audible frequency components of the airflow while operating the computer system and airflow control system.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may be communicated by a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   generating airflow through a computer chassis to a fan air inlet;
   sampling noise in the computer chassis;
   determining the sound pressure level of each of a plurality of audible frequency components of the sampled noise;
   identifying and selecting the highest-energy audible frequency component of the airflow;
   generating a sound wave having a generated frequency equal to the selected audible frequency component of the airflow; and
   introducing the generated sound wave into the airflow with the generated frequency out of phase with the audible frequency component of the airflow.

2. The method of claim 1, further comprising:
   routing the airflow through the computer chassis into a first air duct that is in fluid communication with the fan air inlet; and
   introducing the generated sound wave into the first air duct at a location upstream of the fan air inlet.

3. The method of claim 2, further comprising:
   directing the generated sound wave into the first air duct in a direction substantially perpendicular to a direction of airflow through the first air duct.

4. The method of claim 1, further comprising:
   dynamically identifying the audible frequency components of the airflow and selecting the audible frequency component from among the identified audible frequency components.

5. A method, comprising:
   generating airflow through a computer chassis to a fan air inlet using a fan;
   identifying and selecting an audible frequency component of the airflow;
   generating a sound wave having a generated frequency equal to the selected audible frequency component of the airflow, with a magnitude selected as a function of fan speed; and
   introducing the generated sound wave into the airflow with the generated frequency out of phase with the audible frequency component of the airflow.

6. The method of claim 5, further comprising:
   sensing air pressure within the airflow; and
   generating the audible frequency with a magnitude further selected as a function of the air pressure.

7. An airflow control system for a computer system, the airflow control system comprising:
   a fan for generating airflow through a chassis of the computer system;
   a first air duct in fluid communication with a fan air inlet;
   a microphone for detecting sound in the first air duct;
   a speaker in fluid communication with the first air duct; and a microcontroller in electronic communication with the speaker, the microphone, and the fan, the microcontroller configured for selecting an audible frequency component of the detected sound and causing the speaker to generate a sound wave having a generated frequency equal to and out of phase with the selected audible frequency component, and to select a magnitude of the generated frequency at least partially as a function of fan speed.

8. The airflow control system of claim 7, further comprising:
a first air duct in fluid communication with the fan air inlet; and
a second air duct in fluid communication with the first air duct at a port upstream of the fan air inlet, wherein the speaker is sealingly disposed within the second air duct.

9. The airflow control system of claim 8, wherein the first air duct defines a moving first air column and the second air duct defines a second air column substantially perpendicular to the first air column.

10. The airflow control system of claim 7, wherein the microcontroller comprises a baseboard management controller.

11. An airflow control system, comprising:
a fan for generating airflow through a chassis of the computer system;
a first air duct in fluid communication with a fan air inlet;
a microphone for detecting sound in the first air duct;
a speaker in fluid communication with the first air duct;
an air pressure sensor configured for sensing air pressure within the airflow; and
a microcontroller in electronic communication with the speaker, the microphone, and the air pressure sensor, the microcontroller configured for selecting an audible frequency component of the detected sound and causing the speaker to generate a sound wave having a generated frequency equal to and out of phase with the selected audible frequency component, and with a magnitude selected at least partially as a function of the sensed air pressure.

12. An airflow control system, comprising:
a fan for generating airflow through a chassis of the computer system;
a first air duct in fluid communication with a fan air inlet;
a microphone for detecting sound in the first air duct;
a speaker in fluid communication with the first air duct;
an electronic lookup table specifying one or more frequency components and the corresponding sound pressure level for the computer system; and
a microcontroller in electronic communication with the speaker and the microphone, the microcontroller configured for accessing the electronic lookup table and selecting an audible frequency component of the detected sound from the electronic lookup table and causing the speaker to generate a sound wave having a generated frequency equal to and out of phase with the selected audible frequency component.

13. A computer program product including computer usable program code embodied on a non-transitory computer usable storage medium for controlling airflow in a computer system, the computer program product comprising:
computer usable program code for generating airflow through a computer chassis to a fan air inlet at a controlled airflow rate;
computer usable program code for sampling noise in the computer chassis;
computer usable program code for determining the sound pressure level of each of a plurality of audible frequency components of the sampled noise;
computer usable program code for identifying and selecting one of the audible frequency components of the airflow with the highest-energy audible frequency component;
computer usable program code for generating a sound wave having a generated frequency equal to the selected audible frequency component of the airflow; and
computer usable program code for introducing the generated sound wave into the airflow with the generated frequency out of phase with the audible frequency component of the airflow.

14. The computer program product of claim 13, further comprising computer usable program code for performing a Fourier analysis on the sampled noise to determine the sound pressure level of each audible frequency component.

15. A computer program product comprising computer usable program code embodied on a non-transitory computer usable storage medium for controlling airflow in a computer system, the computer program product comprising:
computer usable program code for generating airflow through a computer chassis to a fan air inlet at a controlled airflow rate;
computer usable program code for identifying and selecting an audible frequency component of the airflow;
computer usable program code for generating a sound wave having a generated frequency equal to the selected audible frequency component of the airflow and with a magnitude selected as a function of fan speed; and
computer usable program code for introducing the generated sound wave into the airflow with the generated frequency out of phase with the audible frequency component of the airflow.

16. The computer program product of claim 15, further comprising computer usable program code for generating the audible frequency with a magnitude further selected as a function of the air pressure.

17. The computer program product of claim 13, further comprising computer usable program code for dynamically identifying the audible frequency components of the airflow and selecting the audible frequency component from among the identified audible frequency components.

* * * * *

UNITED STATES PATENT AND TRADEMARK OFFICE
CERTIFICATE OF CORRECTION

PATENT NO. : 8,165,311 B2
APPLICATION NO. : 12/418700
DATED : April 24, 2012
INVENTOR(S) : Terence Rodrigues et al.

Page 1 of 1

It is certified that error appears in the above-identified patent and that said Letters Patent is hereby corrected as shown below:

On the title page, item (75) "Bruce J. Wilke" should read --Bruce J. Wilkie--.

Signed and Sealed this
Fifth Day of March, 2013

Teresa Stanek Rea
*Acting Director of the United States Patent and Trademark Office*